United States Patent [19]
Caperton

[11] 3,805,462
[45] Apr. 23, 1974

[54] RESTRAINING TUBE FOR SEWER ROD
[76] Inventor: Charles B. Caperton, 52 Pitney Ave., Springlake, N.J. 07762
[22] Filed: Feb. 22, 1973
[21] Appl. No.: 334,673

Related U.S. Application Data
[63] Continuation-in-part of Ser. No. 260,296, June 6, 1972, abandoned, which is a continuation-in-part of Ser. No. 66,544, Aug. 24, 1970, abandoned.

[52] U.S. Cl............. 52/108, 15/104.3 R, 138/103, 138/155, 254/134.3 FT
[51] Int. Cl........................................... E04h 12/18
[58] Field of Search.................. 254/134.3, DIG. 6; 138/103, 155; 52/108; 242/54 A, 54 R; 15/104.3 R

[56] References Cited
UNITED STATES PATENTS
| 2,554,300 | 5/1951 | Hayakawa | 52/108 |
| 2,574,657 | 11/1951 | Pierce | 52/108 |
| 2,643,745 | 6/1953 | Olszewski | 52/108 |
| 3,012,635 | 12/1961 | Blain | 52/108 |
| 3,444,578 | 5/1969 | Caperton | 15/104.3 R |
| 3,450,186 | 6/1969 | Caffa et al. | 52/108 |
| 3,457,685 | 7/1969 | Stein | 52/108 |
| 1,656,215 | 1/1928 | McDonald et al. | 254/DIG. 6 |

FOREIGN PATENTS OR APPLICATIONS
| 1,425,887 | 12/1965 | France | 52/108 |
| 271,061 | 3/1914 | Germany | 52/108 |
| 803,434 | 4/1951 | Germany | 52/108 |

Primary Examiner—Henry C. Sutherland
Attorney, Agent, or Firm—Paul & Paul

[57] ABSTRACT

A rigid restraining tube is provided for use in manholes for restraining the sewer rod, which is used in clearing sewer obstructions, against the reaction forces which are set up when the forwardly driven sewer rod encounters the obstruction. The restraining tube is a series of short sections connected together by rigid links. Each section is split in half axially, forming a series of section halves, adapted to be wound up on opposing reels for storage and transportation. The sections of tube need not abut against each other since they are connected rigidly by the links.

17 Claims, 18 Drawing Figures

INVENTOR.
Charles B. Caperton
BY
Paul & Paul
ATTORNEYS.

INVENTOR.
Charles B. Caperton

BY

Paul & Paul

ATTORNEYS.

RESTRAINING TUBE FOR SEWER ROD

CROSS-REFERENCE TO RELATED APPLICATION

This application is a continuation-in-part of my earlier-filed co-pending application Ser. No. 260,296, filed June 6, 1972, which was a continuation-in-part of Ser. No. 66,544, filed Aug. 24, 1970, both of which are now abandoned bearing the same title.

FIELD OF THE INVENTION

The invention relates broadly to sectionalized, longitudinally split, elongated rigid members adapted to be reeled in for storage, and particularly to the provision of restraining means for improving the operation of the sewer rodding equipment at the point where it is fed down into the manhole and into the sewer pipe which is to be cleared of obstruction.

DESCRIPTION OF THE PRIOR ART

In the prior art, a flexible guide tube or hose has been employed to guide the continuous or coupled spring steel rod from the rodding machine down into the manhole and into the sewer pipe to be cleared. When, however, during the forward drive of the rod into the sewer, an obstruction is encountered, a reaction force is set up in the rod which causes the guide hose to move rearwardly at the bottom of the manhole and introduces thereinto a sharp bend, making it difficult to continue to drive the rod forwardly.

One solution to the problem indicated above has been the provision of a manhole clamp and brace for retaining the position of the guide tube, as is disclosed in my U.S. Pat. Nos. 3,444,578 and 3,497,899. Another solution to the problem is presented by the present invention.

SUMMARY OF THE INVENTION

A principal object of the present invention is to provide improved means for preventing the sewer rod from moving rearwardly at the bottom of the manhole in response to the reaction force which is created when the tool at the forward end of the rod encounters an obstruction, and the rodding machine continues to drive the rod forwardly.

A broad object is to provide an elongated rigid member which is capable of being reeled in for storage.

Another object is to provide a rigid but collapsible restraining tube for use in restraining rearward movement of the sewer rod at the bottom of the manhole when the tool at the forward end of the rod encounters an obstruction.

A further object is to provide a rigid restraining tube of the above type which is adapted to be easily transported from one work location to another, and easily stored within limited space.

A further object is to provide a rigid restraining tube which can be reeled in and stored on one or more reels.

The foregoing objects are achieved by providing a rigid restraining tube formed of short lengthwise sections interconnected by interconnecting links, each section split in the axial direction of the tube, whereby both sectionalized halves of elongated tube may be wound on reels for storage and/or transportation.

BRIEF DESCRIPTION OF THE DRAWING

In FIG. 12, the half sections on each side of the longitudinal center line are adapted to abut against each other, and the half sections on the one side of center are staggered relative to the half sections on the opposite side; In FIG. 16, the half sections occupy staggered positions but do not abut; In FIG. 17, the half sections do not abut and are not staggered; In FIG. 18, the half sections abut and are not staggered.

DESCRIPTION OF THE PREFERRED EMBODIMENTS

Figure 1:
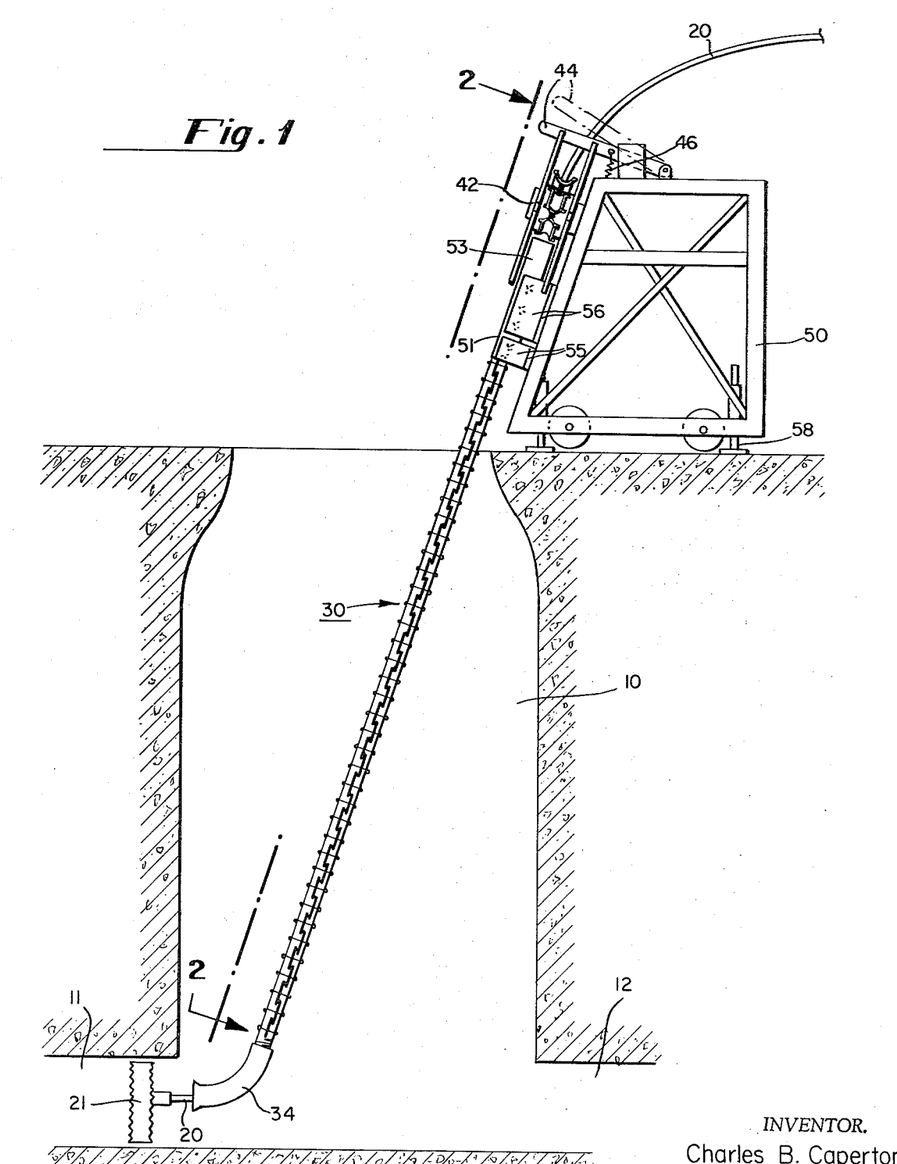
FIG. 1 is an elevational view illustrating the use of the rigid sectionalized split restraining tube of the present invention in a manhole.

In FIG. 1, depicted in cross section, is a manhole 10 having one sewer section 11 extending toward the left and another sewer section 12 extending toward the right. A spring steel sewer rod 20 extends from a rodding machine (not shown) down through the rigid sectionalized split restraining tube 30 of the present invention and into the sewer section 11. A tool 21, which is illustrated as a root saw, is shown connected to the forward end of the sewer rod 20.

To clear an obstruction in the sewer section 11, the rod 20 is driven by the rodding machine forwardly into the sewer section 11 toward the obstruction. The rod is also rotated on its own axis by the rodding machine to rotate the root saw 21. It will be evident that when the root saw 21 encounters the tree root to be sawed and cleared, the forward drive of the rod 20 will be opposed and the forward movement of the rod will be slowed down. As a result, the steel rod 20 will tend to move rearwardly at the bottom of the manhole toward the sewer section 12 and a very sharp bend will be introduced into the rod at the base of the manhole just in front of the sewer section 12. This sharp bend will make it difficult for the rodding machine to apply sufficient forward force against the obstruction to clear the obstruction.

To prevent the condition above from happening, the present application proposes the employment of the rigid sectionalized split tube 30, preferably cast iron or steel. When not in use, or when being transported from one location to another, the split tube 30 is stored in reeled-in form on two reels 41 and 42, with one longitudinal half of the split sectionalized tube being wound on reel 41 and the other half being wound on reel 42. The reels 41 and 42 may be mounted for rotation on shafts 43 supported on any suitable mobile carriage, such as carriage 50 of FIG. 1. Jacks 58 may be provided to raise the carriage wheels above the ground and immobilize the carriage when the carriage has arrived at its working position.

Figures 2, 3, 4:
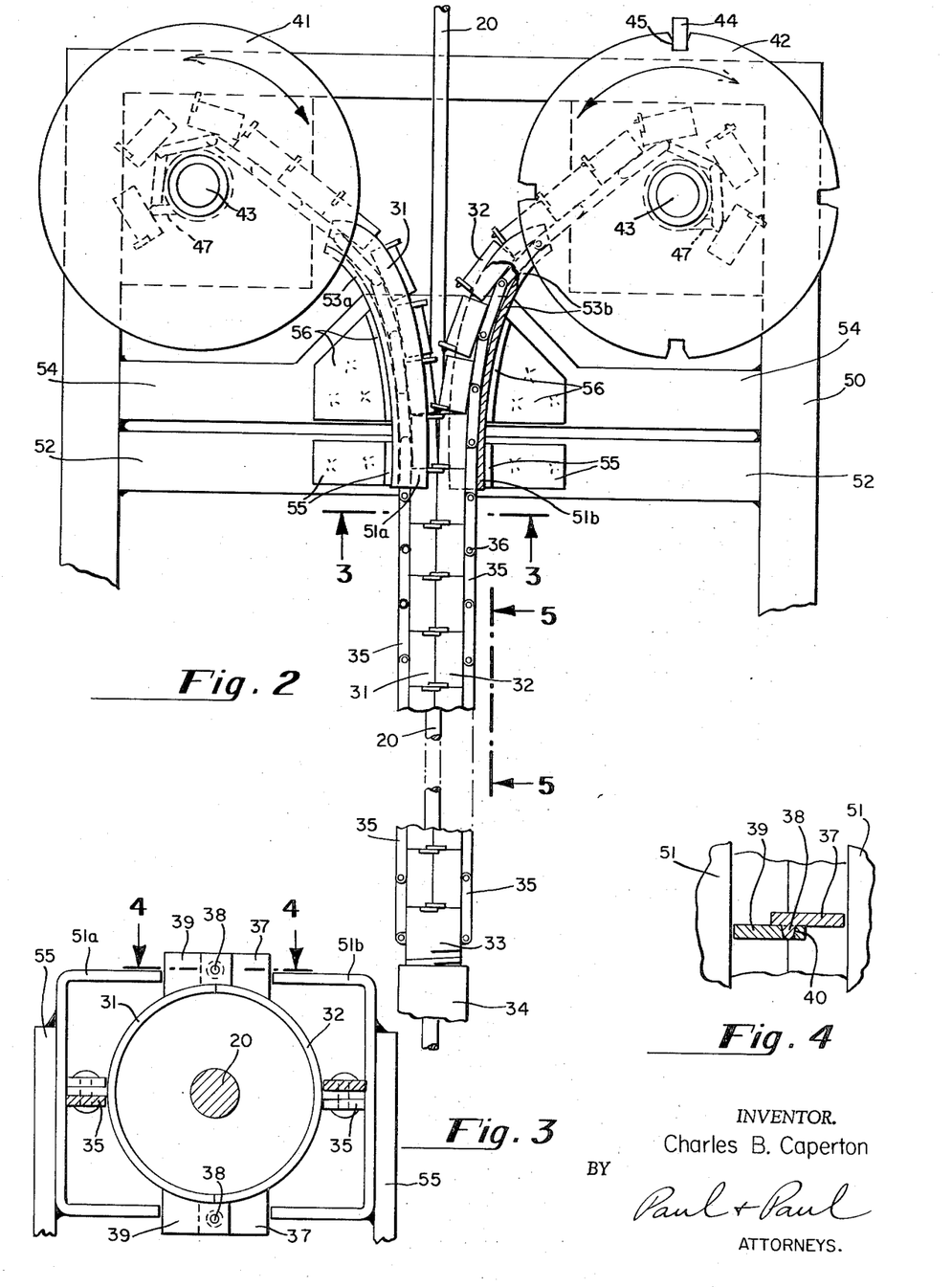
FIG. 2 is an enlarged fragmentary view looking along the line 2—2 of FIG. 1.
FIG. 3 is a view looking along the line 3—3 of FIG. 2.
FIG. 4 is a view looking along the line 4—4 of FIG. 3.

As best seen in FIGS. 2 and 3, tube 30 is comprised of a plurality of short sections each split in half axially, each half consisting of a semi-circular section identified as 31 and 32. The first section (the lowermost section in FIG. 1) identified as 33 is not split and is externally threaded for receiving a curved end piece of tubing 34. (The curvature of the end piece 34 may preferably be somewhat greater than that indicated in the drawing in FIG. 1 so that the curvature of the sewer rod 20 through the end piece 34 is within acceptable limits.)

Figure 5:
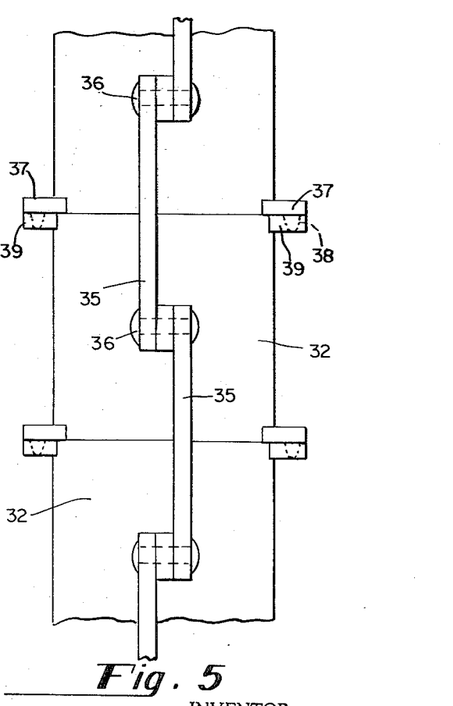
FIG. 5 is a view looking along the line 5—5 of FIG. 2.

The individual semi-circular section halves on each side of the axial split are connected together by connecting links 35. As seen in FIG. 5, adjacent links may be connected together as by rivets 36 or other suitable means.

Figure 6:
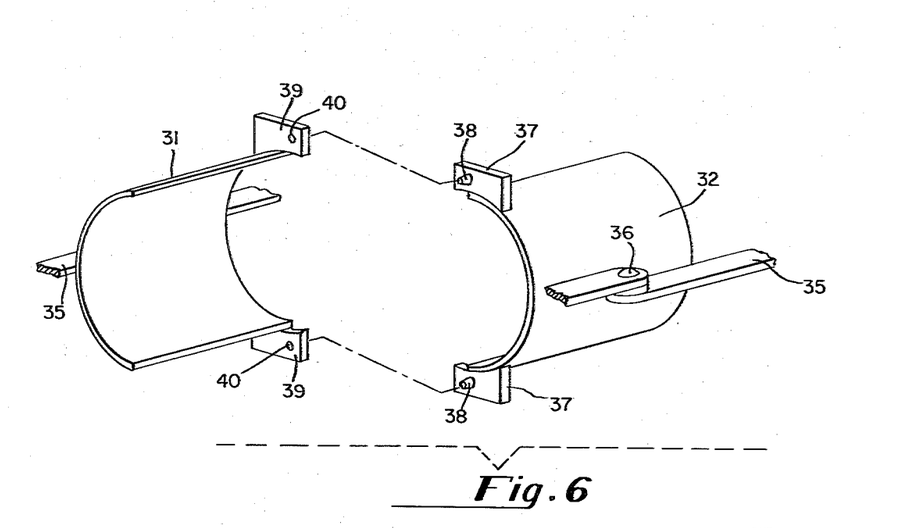
FIG. 6 shows two half sections of the split sectionalized tube.

As seen best in FIG. 6, secured to the lower end of each section half 32 on one side of the axial split, are a pair of brackets 37 spaced apart 180°, or approximately 180°. Each of the brackets 37 carries a lock pin 38 which projects downwardly therefrom. Secured to the upper end of each section half 31 on the other side of the axial split are a pair of brackets 39 spaced apart 180° (approx.) each of which is provided with a recess 40 adapted to receive one of the lock pins 38 of the bracket 37 at the lower end of the section half 32 on the opposite side of the split and located one above the opposite half.

In the operation of the device, when the rodding machine (not shown) and reel carriage 50 have been installed at the work location and before the sewer rod 20 is fed down into the manhole 10, the restraining tube 30 will be in the condition of being fully reeled in, and each of the interconnected lengths of section halves will be stored on its respective reel 41 and 42. At least one of the reels 41 and 42 will be locked against rotation, as by a lock bar 44 pivotally mounted on carriage 50 and adapted to be received within one of a plurality of grooves 45 spaced about the periphery of the reel. A spring 46 maintains the lock bar 44 within the locking groove 45. The fact that one of the reels 42 is locked against rotation prevents withdrawal of the half 32 of the tube and supports the curved end piece 34 at a position just below a stationary guide 51 shown in FIGS. 2 and 3. Guide 51 is formed by a pair of opposing C-shaped members 51a and 51b which face each other, as seen best in cross section in FIG. 3. The C-shaped members 51a and 51b are fixed, as by welding, to a pair of L-shaped brackets 55 which are fixed to cross member 52 of carriage 50.

When the rod 20 is to be fed into the manhole 10 and into the sewer section 11, the rod 20 is first threaded along the axis of the split sectionalized tube and through the end section 33 and curved end piece 34. The tool 21 may then be secured to the end of the rod, or this may be done later. The operator lifts the lock bar 44 allowing the reels 41 and 42 to rotate on their shafts 43 and 44. The weight of the end piece 34, the weight of the non-split end section 33, and the weight of the end portion of the steel sectionalized tube 30 allows the end of the tube to fall downwardly into the manhole, thereby withdrawing the connected half sections 31 and 32 from the reels 41 and 42. As seen most clearly in FIG. 2, as the half sections 31 and 32 leave the reels they pass into and through a converging slide 53 which is mounted on a pair of L-shaped brackets 56 fixed to cross member 54 of carriage 50 just above the stationary guide 51.

Figure 7:
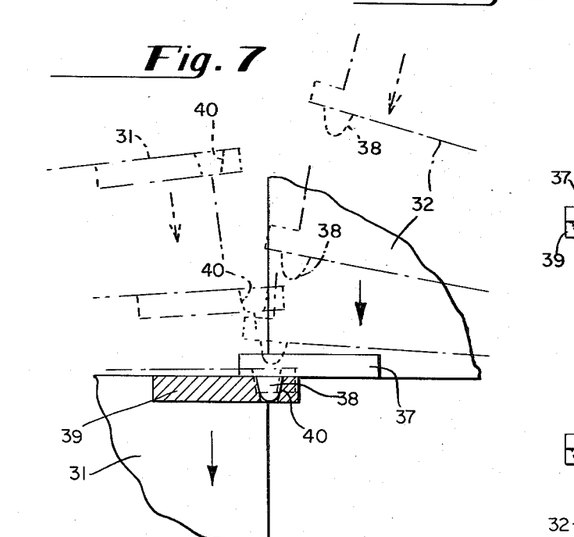
FIG. 7 is an enlarged view illustrating how the half sections of the split sectionalized tube come together and interlock.

The converging slide 53 is formed of a pair of C-shaped members 53a and 53b which together form a funnel-like channel through which the left-hand and right-hand chain of semi-circular section halves pass. As the chains of section halves 31 and 32 enter the wide mouth of the funnel, the brackets 39 and 37 encounter and are guided by the end walls of the C-shaped members 53a and 53b. The links 35 bear against the side walls of the C-shaped members of the slide 53 and the left-hand and right-hand semi-circular half sections 31 and 32 are forced toward each other as indicated in FIG. 2, and interlocking thereof takes place in a manner depicted in FIGS. 2 and 7. It is to be noted that the pair of locking pins 38 at the lower end of a right-hand half section 32 fall into the pair of recesses 39 at the upper end of a left-hand half section 31 on the opposite side of the split. These sections are not directly opposite to each other. The half section 32 carrying the locking pins 38 interlocks with a half section 31 one below the opposite section.

In the operation of the device, the operator watches the tube fall toward the bottom of the manhole. Just before the curved end piece 34 reaches the bottom, the operator drops the lock bar 44 into one of the grooves 45 to stop further pay-out of the tube halves from the opposed reels 41 and 42. This condition is illustrated in FIG. 1. The tube 30 is now rigid from the end piece 34 up to the converging slide 53. Thus, when the tool 21 at the forward end of the forwardly moving rod 20 meets the obstruction in the sewer section 11, the reaction forces on the sewer rod 20 are taken by the rigid tube 30.

When the sewer obstruction has been cleared, and the sewer rod 20 is to be returned to the rodding machine, the operator merely operates the rodding machine to pull the rod 20 in the return direction. The curved end piece 34 then pushes the lower end of the tube 30 upwardly and as a result the two halves of the split sectionalized tube 31 and 32 are returned to their respective reels 41 and 42. If desired, the reels 41 and 42 may be power driven, but as just indicated, this is not essential.

The connected chain of section halves 31 and 32 of tube 30 on each side of the split are fixed to the hubs of the respective reels 41 and 42 as by welding the final links 47 to the reel hubs. As the section halves 31 and 32 are returned to the reels 41 and 42, the individual section halves nest with each other and thus each of the reels 41 and 42 is capable of holding the chain of connected section halves without being objectionably large in diameter.

Figure 8:
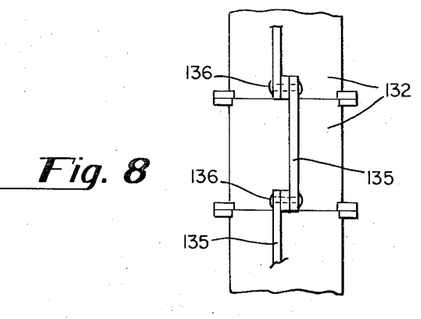
FIG. 8 illustrates a modification in the position of the connecting links on the sections of the tubing.

In FIG. 8, a modification is shown wherein the brackets to which the connecting links 135 are secured, as by rivets 136, are secured to the walls of the tube sections at the lower ends thereof, so that the tube sections pivot about their lower ends.

Figures 9, 10, 11:
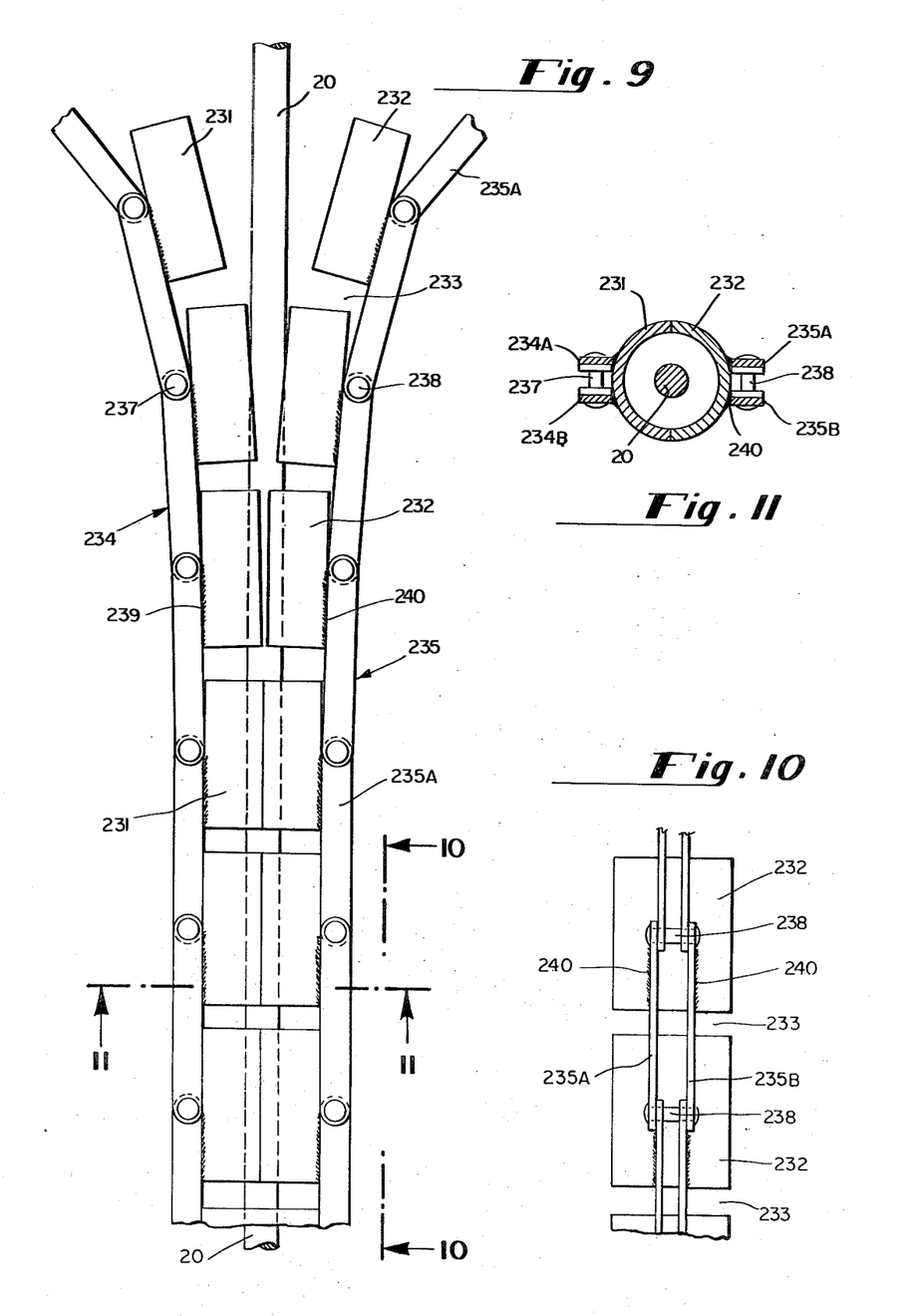
FIG. 9 is an illustration of another form of sectionalized split rigid tubing.
FIG. 10 is a view looking along the line 10—10 of FIG. 9.
FIG. 11 is a view, in section, along the line 11—11 of FIG. 9.

FIG. 9–11 illustrate another form of sectionalized tubing. In FIG. 9–11, the semi-circular section halves 231 and 232 are generally similar to the section halves 31 and 32 of FIGS. 1–8 except that the length of the section halves in FIGS. 9–11 is shorter, relative to the center-to-center distances of the sections, i.e., the axial distances between the hinge points 237 or 238, so that the end of one section-half does not abut against that of the adjacent section half, leaving therebetween a space 233. This space 233 facilitates winding and unwinding of the tubing on and off the reels 41 and 42. Adequate rigidity of the tubing for its intended purpose is maintained by the links 234 and 235 which, in FIGS. 9–11 comprise pairs of parallel rigid bars 234A and B and 235A and B connected at their ends by the hinge pins 237 and 238. The pairs of parallel link bars are welded to the outer surfaces of the section halves 231 and 232 but only along that half portion of the link bars which extends from the hinge 237 and 238 to one edge of the section half. Thus, in FIGS. 9–11, the upper half of the pairs of link bars 234 and 235 are shown to be welded at 239 and 240. This allows the pair of link bars to move pivotally away from the section half along the upper half of the section half, as illustrated in FIG. 9. Welding of the pair of link bars 234 and 235 to the section halves along a portion of the length of the bars adds substantially to the rigidity of the sectionalized tubing when it is extended, as into the manhole. It will be understood that welding of half of the link bar to the tube section half may also be done in the case of link 35 in FIGS. 1–8.

Figure 12:
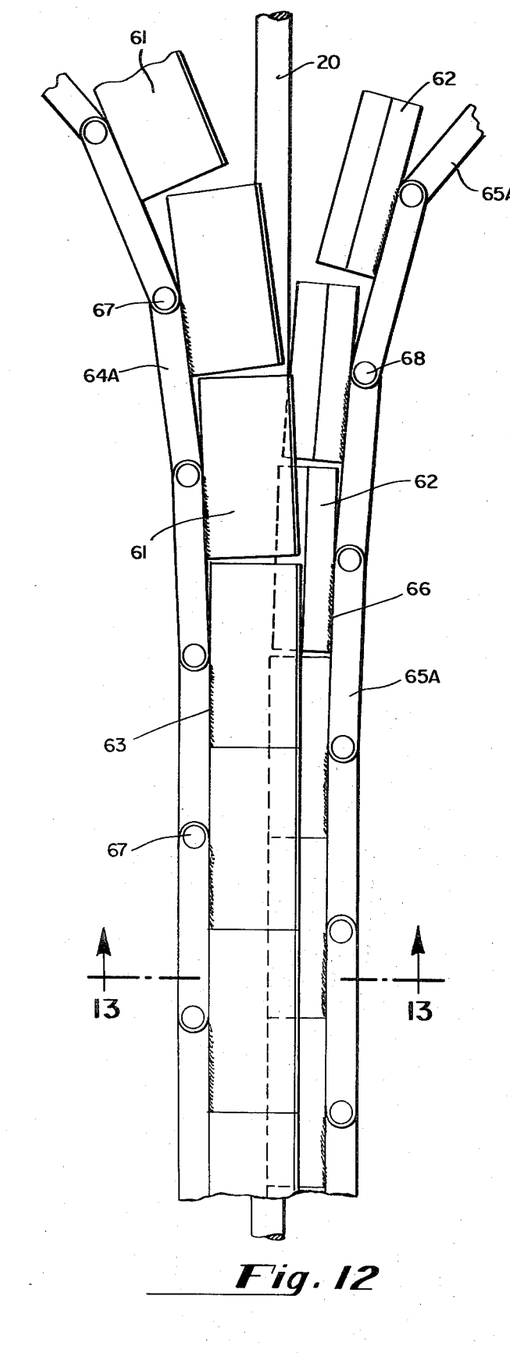
FIG. 12 is a side view of a presently preferred form of sectionalized split tubing.
Figure 13:
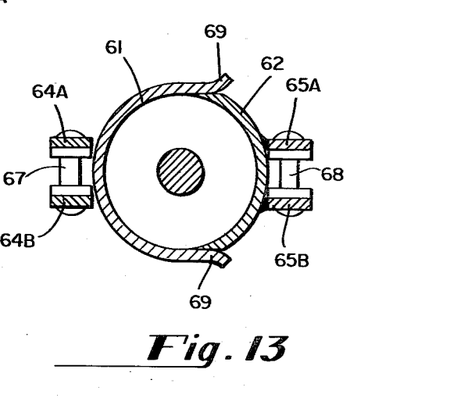
FIG. 13 is a sectional view looking along the line 13—13 of FIG. 12.

FIGS. 12–13 illustrate a presently preferred form of sectionalized split tubing. In FIGS. 12–13, the edges of one of the semi-circular section-half sections 61 are flared, as shown at 69, and the edges of the other half section 62 are beveled or tapered to a fine edge, so that when section half 62 is fitted into the other half section 61 the interior surface of the interfitted section halves does not have a step at the junction, but instead forms a smooth surface.

The advantages of the flared-beveled structure of FIG. 13 is that the alignment tolerances are reduced. That is to say, if when the two section halves are being brought together, one of the section halves is slightly out of line with the other, the flared edges of the one will guide the other half section thereinto.

The rigidity of the tubing of FIGS. 12–13 for its intended purpose is maintained by the links 64 and 65 which are similar to those shown in FIGS. 9–11 and which in FIGS. 12–13 comprise pairs of parallel rigid bars 64A and 64B and 65A and 65B connected at their ends by the hinge pins 67 and 68. The pairs of parallel link bars are welded to the outer surfaces of the section halves 61 and 62 but only along that half portion of the link bars which extends from the hinge 67 and 68 to the one edge of the section half. Thus, in FIGS. 12–13, the upper half of the pairs of link bars 64 and 65 are shown to be welded at 63 and 66.

Figure 14:
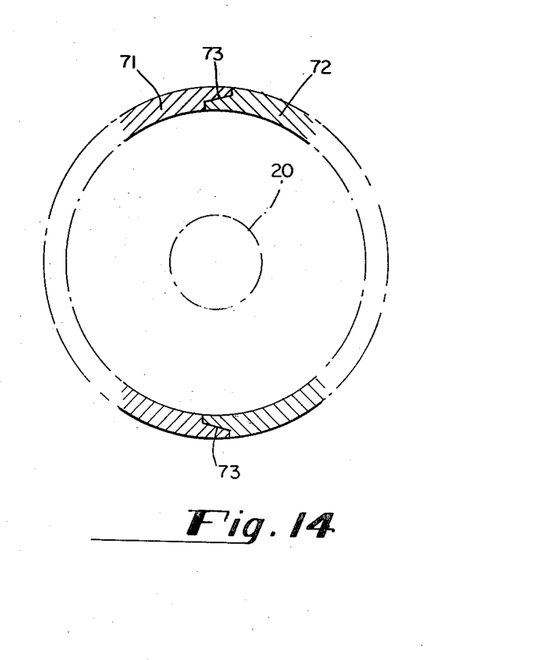
FIGS. 14 and 15 are sectional views of still other forms of split tubing.
Figure 15:
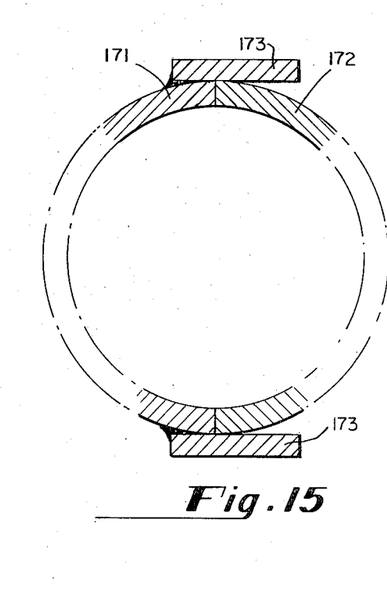

FIGS. 14 and 15 illustrate other embodiments of sectionalized tubing. In FIG. 14, the edges of the section halves 71 and 72 are matingly tapered, as at 73, and the one half 72 is guided into the other section half 71 by the inclined wedge surfaces 73.

In FIG. 15, the edges of the section halves 171 and 172 are adapted to abut against one another. Guide bars 173 are welded at the longitudinal ends, or at spaced intervals, to the outer edge surface of the one section half 171 for guiding the other section half 172 into abutting relationship therewith.

Figure 16:
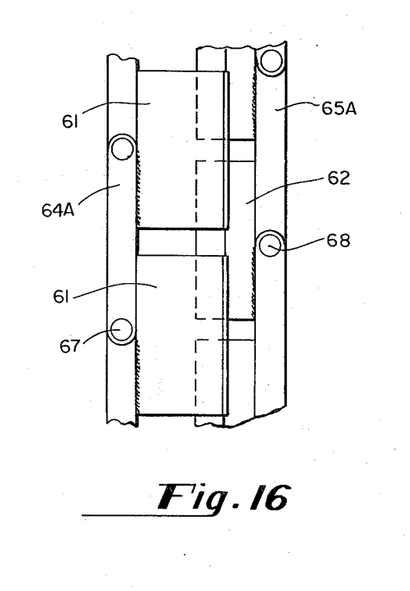
FIGS. 16, 17 and 18 are fragmentary side views of sectionalized split tubing having a cross section similar to that of FIG. 13 but different from FIG. 12 as follows.
Figure 17:
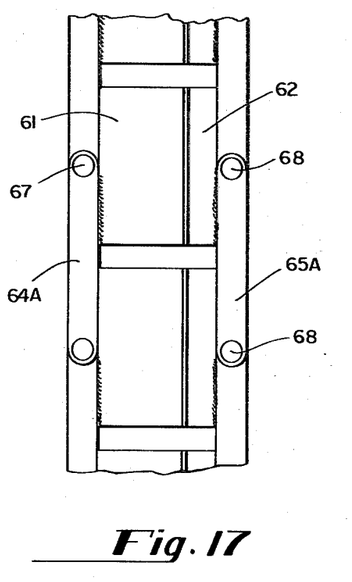
Figure 18:
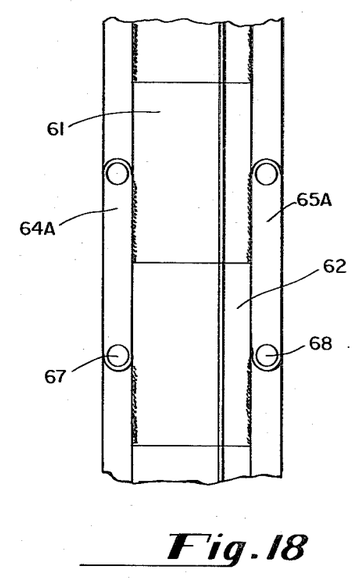

In FIGS. 16–18, various modifications are shown of tubing similar to that of FIGS. 12–13 but varying with respect to whether or not the section halves on the same side of the center line abut or do not abut, and with respect to whether or not the section halves on the opposite side of the center line are aligned or are staggered.

What is claimed is:

1. A rigid restraining tube for restraining sewer rod and the like against reaction forces, said tube comprising:
   a. a first series of short lengthwise hollow section halves on one side of the center axis;
   b. a second series of complementary short lengthwise hollow section halves on the other side of the center axis;
   c. first link means pivotally connecting together the section halves of said first series;
   d. second link means pivotally connecting together the second halves of said second series;
   e. first and second storage means for storing respectively said first and second series of connected section halves;
   f. means mounting said first and second storage means in opposing relation;
   g. converging slide means;
   h. means mounting said converging slide means between said first and second storage means so that said first and second series of connected section halves fed from said storage means pass through said converging slide and are forced thereby into abutting relation to form a rigid elongated hollow confining tube;
   i. and common unitary tubular means secured to the ends of said first and second series of split section halves and through which said sewer rod is passed;
   j. said restraining tube being adapted to be extended downwardly by gravitational forces and retracted by pulling up on said rod.

2. Apparatus according to claim 1 characterized in that:
   a. said first and second link means comprise rigid bars connected pivotally to the outer surface of the section halves of said first and second series.

3. Apparatus according to claim 2 characterized in that said rigid link bars are welded to said section halves between said pivotal connections and one end of said section halves.

4. A device according to claim 2 characterized in that said rigid link bars comprise a pair of parallel bars.

5. Apparatus according to claim 3 characterized in that said rigid link bars comprises pairs of parallel bars.

6. Apparatus according to claim 2 characterized in that said section halves are semi-circular in cross section.

7. Apparatus according to claim 3 characterized in that said section halves are semi-circular in cross section.

8. Apparatus according to claim 4 characterized in that said section halves are semi-circular in cross section.

9. Apparatus according to claim 5 characterized in that said section halves are semi-circular in cross section.

10. Apparatus according to claim 9 characterized in that said converging slide means is a funnel-shaped guide having a large mouth end facing toward said first and second storage means.

11. Apparatus according to claim 10 characterized in that said storage means are reels.

12. Apparatus according to claim 2 characterized in that said section halves have a longitudinal length substantially shorter than the distance between points of pivotal connection of said link bars, thereby to provide spacing between ends of adjacent section halves.

13. Apparatus according to claim 2 characterized in that said section halves have a longitudinal length substantially equal to the distance between points of pivotal connection of said link bars, whereby the ends of said section halves abut against one another.

14. Apparatus according to claim 13 characterized in that pin and recess means are provided at the ends of at least some of said section halves for interlocking said section halves together.

15. Apparatus according to claim 4 characterized in that the edges of the section halves on one side of the center axis are provided with extensions for guiding the section halves on the other side of the center axis into abutting relationship with the section halves on said one side of the center axis.

16. Apparatus according to claim 15 characterized in that the section halves on the one side of the center axis are longitudinally staggered relative to the section halves on the other side of the center axis.

17. Apparatus according to claim 16 characterized in that the section halves have a length substantially shorter than the distance between points of pivotal connection of said link bars, thereby to provide spacing between the ends of the adjacent section halves.

* * * * *